United States Patent
Qi et al.

(10) Patent No.: US 8,768,352 B2
(45) Date of Patent: Jul. 1, 2014

(54) PREDEFINED ROAMING AND IDLE CHANNELS

(75) Inventors: Emily H. Qi, Portland, OR (US); Myron P. Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 13/053,799

(22) Filed: Mar. 22, 2011

(65) Prior Publication Data

US 2012/0244857 A1    Sep. 27, 2012

(51) Int. Cl.
    *H04W 4/00* (2009.01)

(52) U.S. Cl.
    USPC .... 455/434; 455/41.2; 455/552.1; 455/553.1; 370/328; 370/329; 370/330

(58) Field of Classification Search
    USPC .......... 455/432.1, 432.2, 432.3, 434, 41.2, 455/450, 451, 452.1, 452.2, 552.1, 553.1; 370/328, 329, 330
    See application file for complete search history.

(56) References Cited

U.S. PATENT DOCUMENTS

| | | | | |
|---|---|---|---|---|
| 5,596,624 A * | 1/1997 | Armbruster et al. | ....... | 455/435.1 |
| 6,101,389 A * | 8/2000 | Koizumi et al. | ............. | 455/450 |
| 6,131,038 A * | 10/2000 | Sekine | ......... | 455/513 |
| 6,842,460 B1 * | 1/2005 | Olkkonen et al. | ........... | 370/465 |
| 7,236,782 B2 * | 6/2007 | Utsunomiya et al. | ........ | 455/434 |
| 8,126,502 B2 * | 2/2012 | Trainin | ...... | 455/552.1 |
| 8,238,296 B2 * | 8/2012 | Sim et al. | ...... | 370/329 |
| 8,301,190 B2 * | 10/2012 | Chandra | .......... | 455/552.1 |
| 2007/0275756 A1 * | 11/2007 | Choi | ............. | 455/557 |
| 2009/0111466 A1 * | 4/2009 | Montemurro et al. | ....... | 455/434 |
| 2011/0038357 A1 * | 2/2011 | Gong | ............. | 370/338 |
| 2011/0162019 A1 * | 6/2011 | Lee et al. | ........ | 725/81 |
| 2012/0134324 A1 * | 5/2012 | Chu et al. | ..... | 370/329 |

* cited by examiner

Primary Examiner — Olumide T Ajibade Akonai
(74) Attorney, Agent, or Firm — Kacvinsky Daisak Bluni PLLC

(57) ABSTRACT

In various embodiments, only a few selected channels are available to be used for scanning for a network controller in a wireless network. In various other embodiments, only a few selected channels are available to be used as an idle channel in a wireless network. In both cases, the channels available for such purposes are fewer in number than the channels available for operational communications. In some embodiments, these channels are in a different industry band than the channels used for operational communications.

27 Claims, 4 Drawing Sheets

PREDEFINED ROAMING AND IDLE CHANNELS

BACKGROUND

When a mobile communications device needs to join a network or move from one network to another, it typically has to scan all available channels to find an appropriate network controller. In particular, the 2.4 GHz band has 11 channels and the 5 GHz band has 36 channels to scan. The 60 GHz band, which is still being developed, may have even more. To make matters worse, a multi-radio device may need to scan all the channels in multiple bands. If a mobile device is moving, it may have to scan for a new network controller frequently. All this scanning can consume large amounts of battery power in the mobile device. When a mobile device is in idle mode, a similar listening process may need to be followed on multiple channels to determine if the network controller has data to send to the mobile device, again consuming large amounts of battery power.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
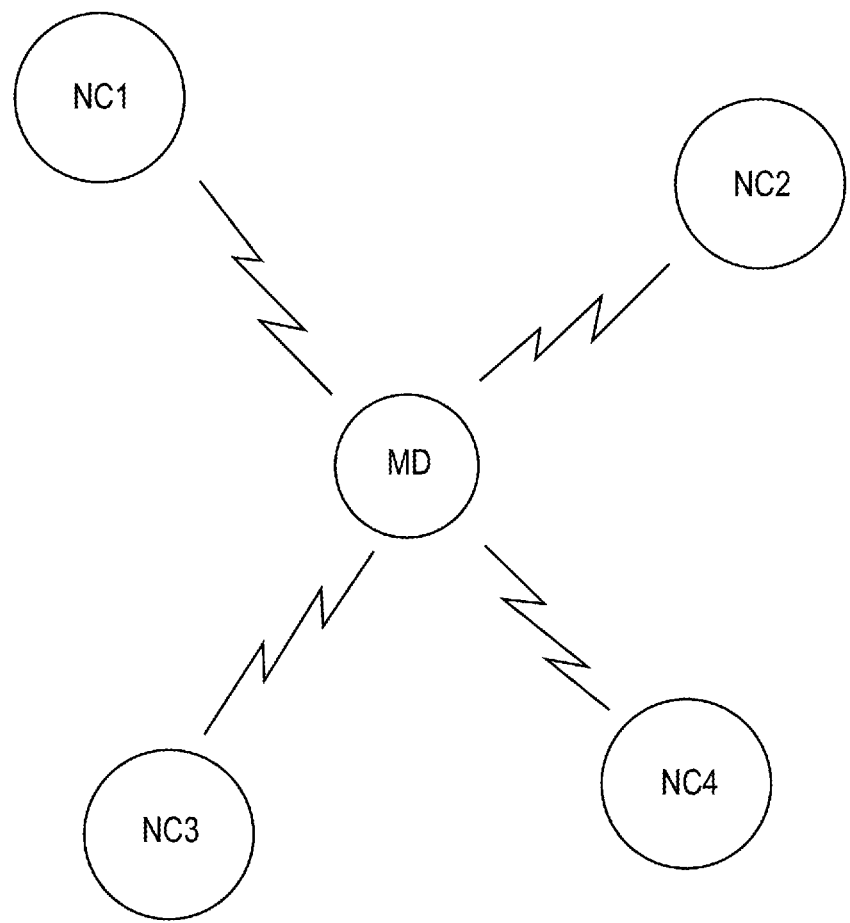
FIG. 1 shows a mobile device within communications distance of multiple network controllers.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a non-transitory computer-readable medium, which may be read and executed by one or more processors to enable performance of the operations described herein. Such a computer-readable medium may include any tangible non-transitory mechanism for storing information in a form readable by one or more computers, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

Within this document, a 'roaming' channel is a channel that a mobile device listens to in order to find an appropriate network controller with which it may become associated. Within this document, the term 'scanning' indicates that the mobile device listens to multiple such channels. Within this document, an 'idle' channel is a channel that a mobile device may use to maintain its association with a network controller even though it may have no current operational communications with that network controller. Within this document, an 'operational' channel is a channel that a mobile device uses for its operational communications with the network controller (or with another device in a peer-to-peer communication). 'Operational communications' are those communications that serve to exchange data between devices, rather than just serving as a way to establish or maintain a link between those devices. In some embodiments, a mobile device may be using multiple roaming channels and/or multiple operational channels and/or multiple idle channels, although a single idle channel might be considered sufficient in many cases. In some embodiments, the same channel may serve as a roaming channel and/or an idle channel and/or an operational channel.

In some embodiments, channels in one band may serve as roaming and/or idle channels for devices that perform operational communications in another band. Since lower frequency signals tend to have less absorption and therefore travel farther, the lower frequency band may be used for the roaming/idle channels to provide a wider physical coverage area for those functions, even though the operational channels may be limited to the upper bands. For example, channels in the 2.4 GHz band may serve as roaming and/or idle channels for devices that use the 5 GHz and/or 60 GHz bands for operational communications.

FIG. 1 shows a mobile device within communications distance of multiple network controllers. Both the mobile device (MD) and the network controllers (NC) may contain a processor, a memory, and a radio, and be adapted for communicating in a wireless network. The MD may communicate with each of the NC's in various ways, such as but not limited to: 1) scanning various channels to find a channel that is available for a subsequent association with an NC, 2) performing operational communications with an NC, 3) using an idle channel to maintain an association with an NC even though no operational communications are taking place with it, 4) etc.

Figure 2:
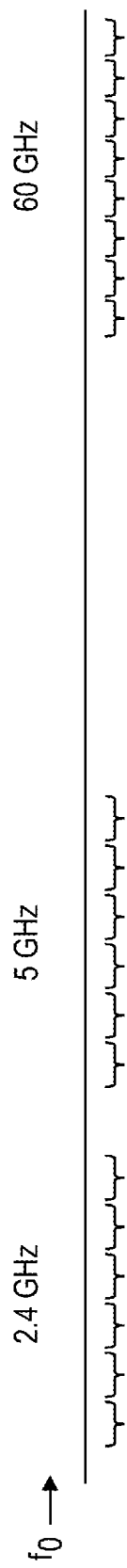
FIG. 2 shows a diagram of various frequency bands used in wireless communications, according to an embodiment of the invention.

FIG. 2 shows a diagram of various frequency bands used in wireless communications, according to an embodiment of the invention. Three bands are shown that are defined for communications in various industry standards, and are typically referred to as the 2.4 GHz band, the 5 GHz band, and the 60 GHz band, but other embodiments may use other industry bands. Each of these names indicates the approximate frequency of the band. Within the context of this document, frequency bands that are defined by one or more industry standards for use in wireless communications are referred to as 'industry bands'. Such industry bands typically include multiple channels, each having a different predefined center frequency. For simplicity of illustration, each industry band in FIG. 2 only shows approximately 6-8 channels, but such industry bands may have more or fewer channels than that. Conventional wireless communications systems perform all communications between two devices within a single industry band, restricting roaming, operational communications, and the idle channel to one industry band.

Figure 3:
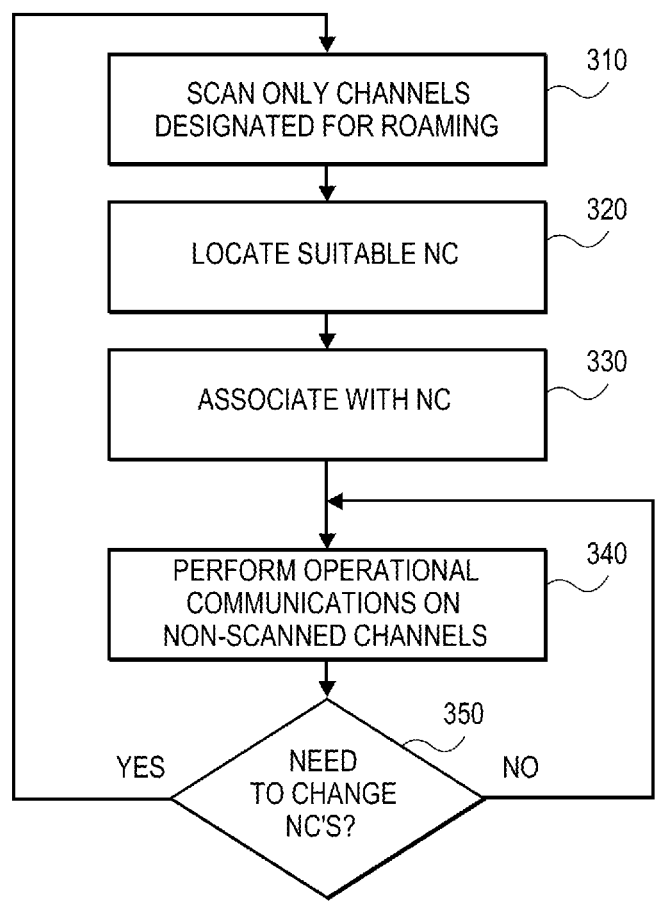
FIG. 3 shows a flow diagram of a method of using roaming channels to find and associate with a network controller, according to an embodiment of the invention.

FIG. 3 shows a flow diagram of a method of using roaming channels to find and associate with a network controller, according to an embodiment of the invention. In the illustrated embodiment, at 310 an MD may scan only designated roaming channels in an attempt to find an NC with which to associate. This may be part of an attempt by an unassociated MD to become associated (for instance, when it is first powered on), or may be part of an attempt by an associated MD to become associated with a different NC (for example, when it is moving from one NC's coverage area to another NC's coverage area).

In some embodiments, the designated roaming channels may be a subset of operational channels in the same industry band. In other embodiments, the designated roaming channels may be different than the operational channels but in the same industry band. In still other embodiments, the designated roaming channels may be in a different industry band than the operational channels. In any case, the designated roaming channels are fewer in number than the potential operational channels.

At 320 the MD may locate a suitable NC (e.g., signal strength, data rate, type of services available, etc., are acceptable), and at 330 may go through the association process to become a member of that NC's network. At 340 the MD may commence operational communications with the NC over channels that were not included in the set of roaming channels that were scanned. Depending on the embodiment, some of the operational channels may be the same as the some of the scanned channels, but the operational channels must include channels that were not scanned.

If the MD is moving from one NC coverage area to another, or if the wireless environment changes in a way that makes it desirable to change NC's, at 350 the MD may return to 310 to begin the scanning process again.

Figure 4:
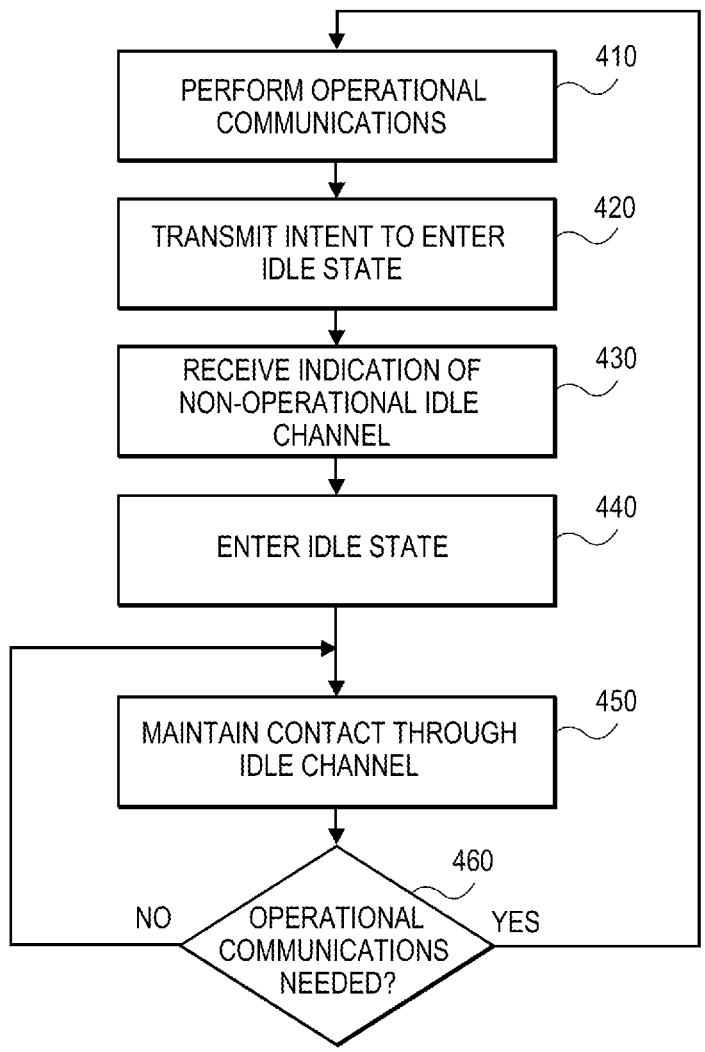
FIG. 4 shows a flow diagram of a method of selecting an idle channel, according to an embodiment of the invention.

FIG. 4 shows a flow diagram of a method of selecting an idle channel, according to an embodiment of the invention. If an MD is already associated with and performing operational communications with a selected NC at 410, at some point the MD may determine that it has no more need to communicate for awhile and can save power by entering an idle state, a state in which it is not available to communicate operational data. The criteria for making that determination, and the internal configuration that allows it to save power, are beyond the scope of this document.

However, while the MD is in the idle state, it is possible that the NC may acquire data that is destined for the MD. In order to let the MD know of this impending data, the NC and MD need some way to communicate this fact during the MD's idle state. One such way is to use a single idle channel, or a small number of idle channels, that the MD will monitor, either continuously or at designated intervals. However, there are numerous channels that could conceivably be used for such a purpose.

In order to reduce this number to a manageable amount, at 420 the MD may signal the NC of its intention to enter the idle state, and at 430 the MD may receive a transmission from the NC that indicates which channel to use as an idle channel. Although there may be reasons to designate more than one channel as an idle channel to be monitored, in a preferred embodiment only one channel will be designated because the reduced processing in the MD may reduce power consumption even more.

Although the above description shows the MD receiving the idle channel identifier only after indicating the MD's intention to enter an idle mode, in some embodiments the NC may transmit that information to the MD at an earlier time without prompting. In one embodiments, the NC may transmit the channel number (and industry band if applicable) of the idle channel(s) in a beacon frame, a probe response frame, or both.

Regardless of the manner of receiving the idle channel's identity, at 440 the MD may enter the idle state, using the designated idle channel to maintain minimal contact with the NC at 450 so that it will not become disassociated from the NC. While in the idle state, if the MD determines it needs to resume operational communications, it may do so at 460. This determination may be made either because the MD determines it has data to send, or because the NC informs the MD over the idle channel that the NC has data to send to the MD.

The previous descriptions assume that a small set of the available channels will be designated as roaming and/or idle channels, so as to reduce the number of such channels that a device needs to monitor. In some embodiments, the network controller may choose which channels are to be so designated. In other embodiments, an industry standard may specify which channels are to be so designated.

The foregoing description is intended to be illustrative and not limiting. Variations will occur to those of skill in the art. Those variations are intended to be included in the various embodiments of the invention, which are limited only by the scope of the following claims.

What is claimed is:

1. A method of communicating in a wireless network, comprising:
   scanning only roaming channels in a pre-defined subset of available channels in a first industry band of channels to find an available network controller;
   identifying a particular network controller on a particular channel in the subset;
   forming an association with the particular network controller; and
   performing operational communications with the particular network controller on at least one operational channel different than any scanned roaming channel in the pre-defined subset of available channels.

2. The method of claim 1, wherein said at least one operational channel is in a second industry band different than the first industry band.

3. The method of claim 2, wherein the first industry band is a 2.4 GHz band and the second industry band is either a 5 GHz band or a 60 GHz band.

4. The method of claim 1, the pre-defined subset of available channels comprising channels 1, 6, and 11 of a 2.4 GHz band.

5. An apparatus for communicating in a wireless network, the apparatus having a processor, a memory, and a radio, the apparatus to:
   scan only roaming channels in a pre-defined subset of available channels in a first industry band of channels to find an available network controller;
   identify a particular network controller on a particular channel in the subset;
   form an association with the particular network controller; and
   perform operational communications with the particular network controller on at least one operational channel different than any scanned roaming channel in the pre-defined subset of available channels.

6. The apparatus of claim 5, wherein said at least one operational channel is in a second industry band different than the first industry band.

7. The apparatus of claim 6, wherein the first industry band is a 2.4 GHz band and the second industry band is either a 5 GHz band or a 60 GHz band.

8. The apparatus of claim 5, the pre-defined subset of available channels comprising channels 1, 6, and 11 of a 2.4 GHz band.

9. A computer-readable non-transitory storage medium that contains instructions, which when executed by one or more processors result in performing operations for communicating in a wireless network comprising:
   scanning only roaming channels in a pre-defined subset of available channels in a first industry band of channels to find an available network controller;
   identifying a particular network controller on a particular channel in the subset;
   forming an association with the particular network controller; and
   performing operational communications with the particular network controller on at least one operational channel different than any scanned roaming channel in the pre-defined subset of available channels.

10. The medium of claim 9, wherein said at least one operational channel is in a second industry band different than the first industry band.

11. The medium of claim 10, wherein the first industry band is a 2.4 GHz band and the second industry band is either a 5 GHz band or a 60 GHz band.

12. The medium of claim 9, the pre-defined subset of available channels comprising channels 1, 6, and 11 of a 2.4 GHz band.

13. A method of communicating in a wireless network, comprising:
   forming an association with a device in a wireless communications network; and
   communicating, with the device, an indication of which channel to use as an idle channel to maintain the association with the device during a period of non-operational communications with the device;
   wherein the indicated idle channel is selected from a pre-defined subset of available channels in a pre-defined industry communications band and is in a different industry band than channels used for operational communications with the ether device.

14. The method of claim 13, wherein the subset of channels consists of channels 1, 6, and 11 in a 2.4 GHz band.

15. The method of claim 13, wherein said communicating the indication comprises communicating the indication in a beacon and/or a probe response.

16. The method of claim 13, wherein said communicating the indication comprises transmitting the indication to a mobile device.

17. The method of claim 13, wherein said communicating the indication comprises receiving the indication from a network controller.

18. An apparatus for communicating in a wireless network, the apparatus having a processor, a memory, and a radio, the apparatus to:
   form an association with a device in a wireless communications network; and
   communicate, with the device, an indication of which channel to use as an idle channel to maintain the association with the device during a period of non-operational communications with the device;
   wherein the indicated idle channel is selected from a pre-defined subset of available channels in a pre-defined industry communications band and is in a different industry band than channels used for operational communications with the ether device.

19. The apparatus of claim 18, wherein the subset of channels consists of channels 1, 6, and 11 in a 2.4 GHz band.

20. The apparatus of claim 18, wherein said communicating the indication comprises communicating the indication in a beacon and/or a probe response.

21. The apparatus of claim 18, wherein the apparatus comprises a network controller to transmit the indication to a mobile device.

22. The apparatus of claim 18, wherein the apparatus comprises a mobile device to receive the indication from a network controller.

23. A computer-readable non-transitory storage medium that contains instructions, which when executed by one or more processors result in performing operations for communicating in a wireless network comprising:
   forming an association with a device in a wireless communications network; and
   communicating, with the device, an indication of which channel to use as an idle channel to maintain the association with the device during a period of non-operational communications with the device;
   wherein the indicated idle channel is selected from a pre-defined subset of available channels in a pre-defined industry communications band and is in a different industry band than channels used for operational communications with the ether device.

24. The medium of claim 23, wherein the subset of channels consists of channels 1, 6, and 11 in a 2.4 GHz band.

25. The medium of claim 23, wherein said communicating the indication comprises communicating the indication in a beacon and/or a probe response.

26. The medium of claim 23, wherein said communicating the indication comprises transmitting the indication to a mobile device.

27. The medium of claim 25, wherein said communicating the indication comprises receiving the indication from a network controller.

* * * * *

UNITED STATES PATENT AND TRADEMARK OFFICE
CERTIFICATE OF CORRECTION

PATENT NO.       : 8,768,352 B2                                       Page 1 of 1
APPLICATION NO.  : 13/053799
DATED            : July 1, 2014
INVENTOR(S)      : Emily H. Qi et al.

It is certified that error appears in the above-identified patent and that said Letters Patent is hereby corrected as shown below:

In The Claims

In column 6, line 16, In Claim 13, delete "ether device." and insert -- device. --, therefor.

In column 6, line 41, In Claim 19, delete "ether device." and insert -- device. --, therefor.

In column 6, line 67, In Claim 25, delete "ether device." and insert -- device. --, therefor.

Signed and Sealed this
Twenty-first Day of July, 2015

Michelle K. Lee
*Director of the United States Patent and Trademark Office*